United States Patent [19]
Nelson

[11] Patent Number: 5,212,582
[45] Date of Patent: May 18, 1993

[54] ELECTROSTATICALLY CONTROLLED BEAM STEERING DEVICE AND METHOD

[75] Inventor: William E. Nelson, Dallas, Tex.

[73] Assignee: Texas Instruments Incorporated, Dallas, Tex.

[21] Appl. No.: 846,305

[22] Filed: Mar. 4, 1992

[51] Int. Cl.$^5$ .............................. G02B 26/08
[52] U.S. Cl. .................. 359/224; 359/214; 359/291; 359/846; 358/206; 340/815.04
[58] Field of Search ............ 359/213, 214, 221, 224, 359/291, 846, 847, 848; 358/206, 231; 340/815.04, 719

[56] References Cited

U.S. PATENT DOCUMENTS

| | | | |
|---|---|---|---|
| 4,317,611 | 3/1982 | Petersen | 359/214 |
| 4,356,730 | 11/1982 | Cade | 358/231 |
| 4,421,381 | 12/1983 | Ueda et al. | 359/214 |
| 4,662,746 | 5/1987 | Hornbeck | |
| 5,018,256 | 5/1991 | Hornbeck | 359/846 |
| 5,061,049 | 10/1991 | Hornbeck | 359/224 |
| 5,083,857 | 1/1992 | Hornbeck | 359/291 |

Primary Examiner—Loha Ben
Attorney, Agent, or Firm—Julie L. Reed; James C. Kesterson; Richard L. Donaldson

[57] ABSTRACT

A device for steering light and its method of manufacture are disclosed. The device in the preferred embodiment consists of a multi-layer structure on a substrate. The substrate contains at least one electrode (36) for addressing a deflectable element (16) causing it to deflect towards the activated electrode (36). Upon the deflectable element (16) is at least one support post (62) which is positioned approximately along the axis of rotation (24) of the deflectable element (16). A reflecting element (61) is supported by the post (62) and deflects as the first element (16) deflects. The second element (62) is of far greater extent than the first element (16). Additionally, the method of manufacture of such a device is disclosed.

10 Claims, 6 Drawing Sheets

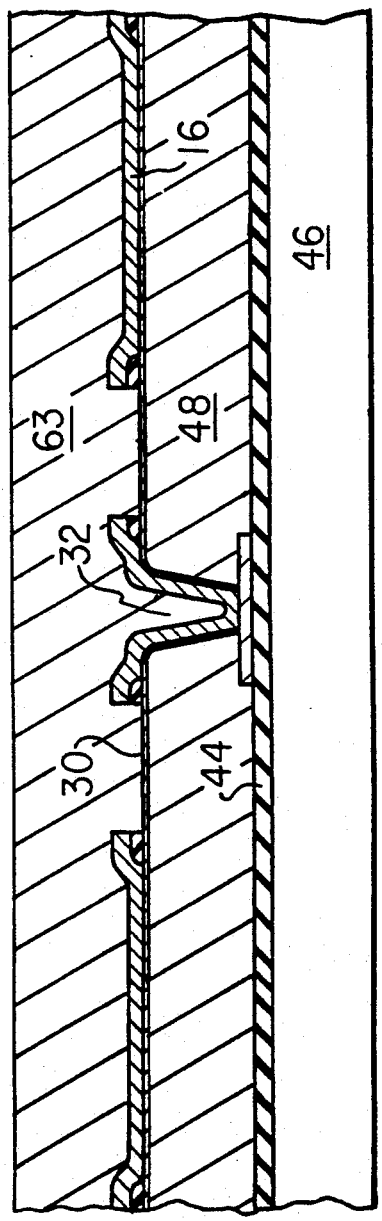
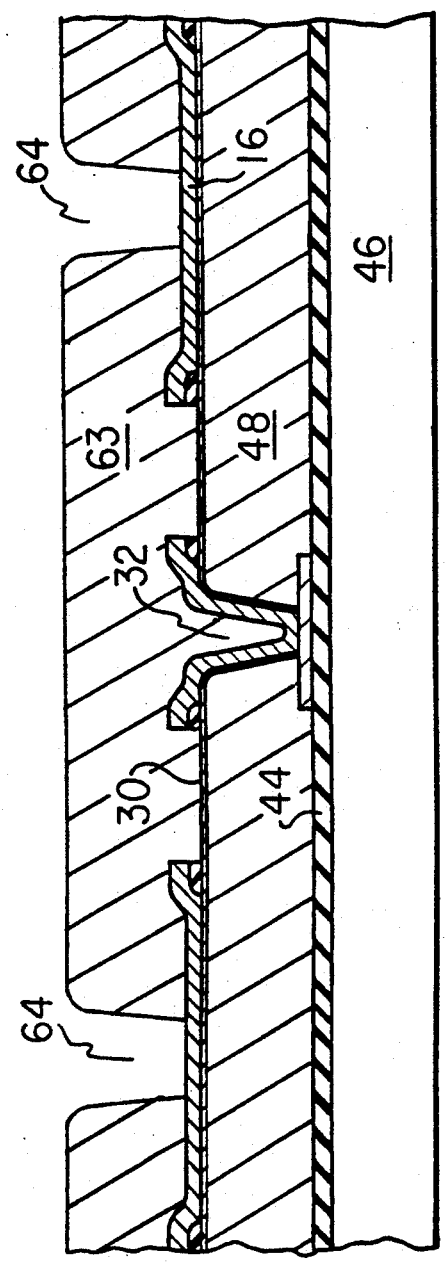
Fig.12a
Fig.12b

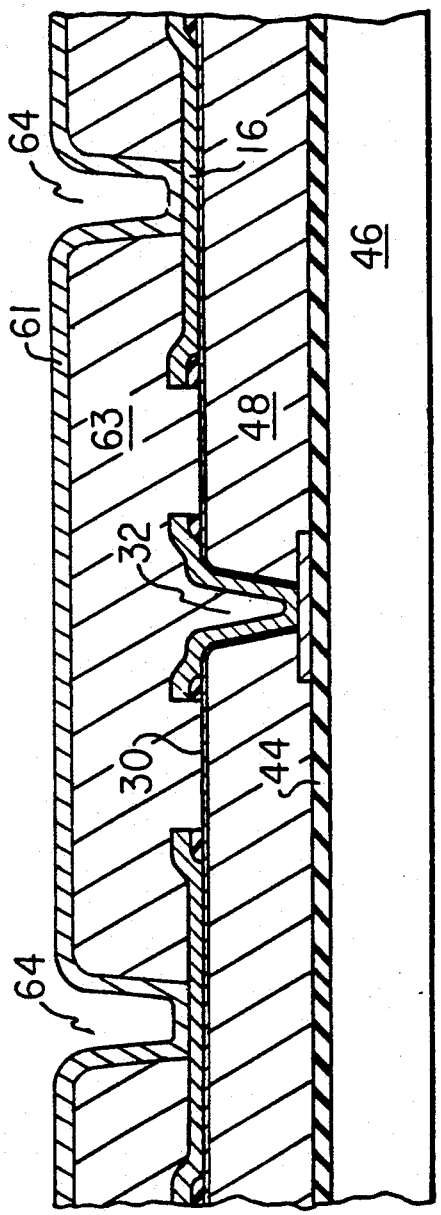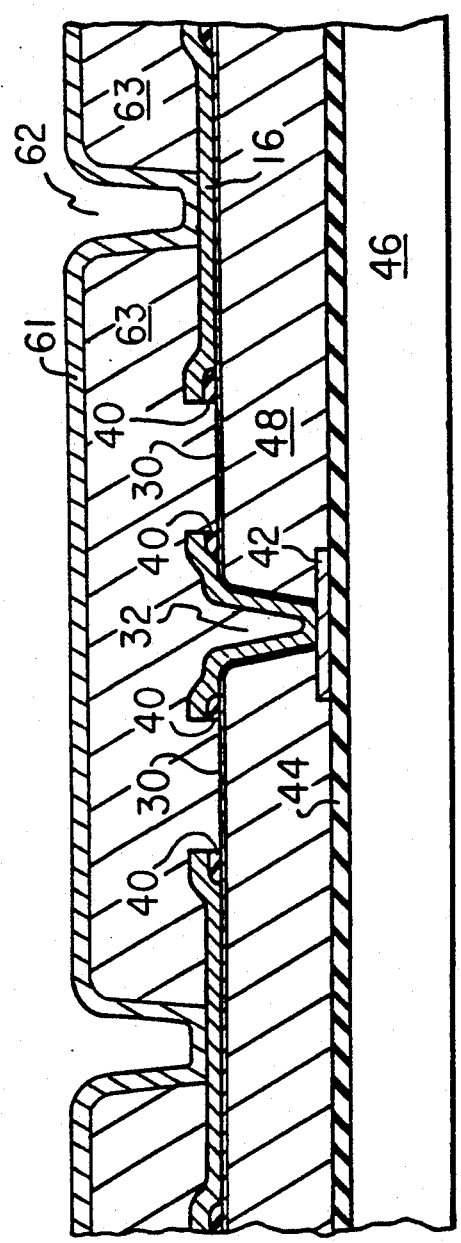

ELECTROSTATICALLY CONTROLLED BEAM STEERING DEVICE AND METHOD

BACKGROUND OF THE INVENTION

1. Field of the Invention

This invention relates to electro-optic devices, more particularly to beam steering devices.

2. Background of the Invention

Light may be steered by many classes of electro-optic devices. Among these are galvanometric scanners, resonant mirrors, and rotating polygon mirrors.

Galvanometric scanners reflect light off a mirror rotating about an axis through a small angle. The rotation results from application of an electrical current in the presence of a fixed magnetic field. The current generates a proportional magnetic field. The interaction between the two magnetic fields causes the lead conducting the current to twist. The twisting motion drives a mirror used to steer light.

Resonant mirrors reflect light off a mirror that also moves in response to an electrical signal. The signal drives a component, such as a voice coil, which presses against a spring-mounted, hinged mirror. A counterweight attached to the mirror and the mirror act together like a tuning fork. The mirror then oscillates at a resonant frequency to steer light.

A rotating polygon mirror normally consists of a multi-faceted mirror rotated at high speed by a motor. The mirror elements are typically facets cut onto the periphery of a disk, though other shapes exist. This assembly occurs more frequently in optical scanners, converting digital inputs to light patterns, than in other applications.

All three of these examples are relatively large, expensive and susceptible to shock and vibration. These disadvantages limit the applicability of these devices in a size-constrained and/or a mobile environment. A need has arisen for a means for steering light that is very compact, inexpensive, power efficient and usable in a mobile environment.

SUMMARY OF THE INVENTION

The present invention disclosed herein comprises a device for steering light. The device is a multi-layer structure comprising an electrode layer, a post or spacer layer, a deflectable element layer, a second post or spacer layer, and a final reflecting layer. The electrode is used to address the deflectable element, causing the element to deflect towards the activated electrode. As the element deflects, the post of the reflecting layer deflects also. This in turn causes the reflective element to deflect. The extent of the reflecting layer is greater than the deflectable element layer, thus providing an increase in active area and preventing any diffraction from the deflectable element in the optical system using this structure.

BRIEF DESCRIPTION OF THE DRAWINGS

For a more complete understanding of the present invention and for further advantages thereof, reference is now made to the following Detailed Description taken in conjunction with the accompanying Drawings in which:

FIGS. 12a-12d show a structure with two active layers as it undergoes the manufacturing process.

DETAILED DESCRIPTION OF THE PREFERRED EMBODIMENTS

Figure 1:
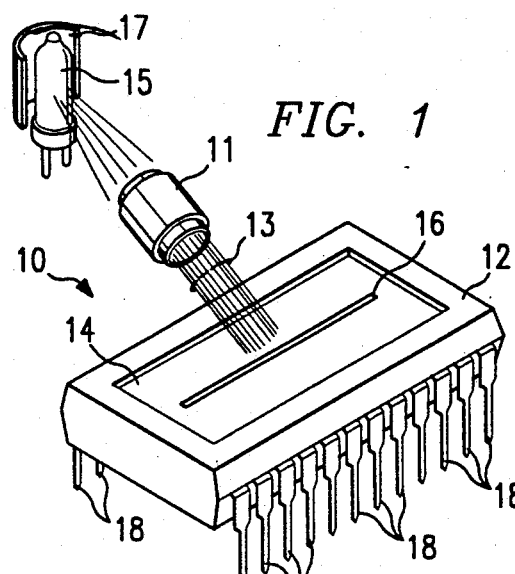
FIG. 1 depicts a first embodiment of the disclosed invention.

FIG. 1 depicts beam steering device 10 containing one embodiment of the disclosed invention. Device 10 comprises a body 12, typically plastic, encasing a substrate 14 and a long thin deflectable mirror element 16. Substrate 14 typically contains a shallow well (shown in FIG. 2) having a base and sidewalls that support mirror 16 by flexible hinges (shown in FIG. 2). The well allows mirror element 16 to rotate out of the plane containing the substrate and about the axis formed by the hinges all the while maintaining the flatness of mirror element 16. Schematically, a condenser system directs a beam of light 13 from light source 15 and a reflector 17 onto DMD (digital micromirror device, also known as deformable mirror device) 16 through lens 11.

In a practical application, light bundle 13 may be from any source of light, such as a laser, and may contain image information. For example, lens 11 may be relaying light from another spatial light modulator (SLM) on to the DMD scanning mirror. The scanned light may later converge to a focus at an image plane beyond device 10, with or without passing through an intermediate lens element.

Mirror element 16 operates substantially in the plane of substrate 14. It does not introduce a defocusing effect or any field curvature into the final image as in conventional scanners.

Device 10 also has connected to it a varying number of electrical leads 18 which connect it to other subcomponents. The number of leads 18 may vary depending on the sophistication of circuitry contained in device 10. For instance, substrate 14 might itself be a semiconductor and comprise an internal signal generator that controls the rate of rotation of mirror element 16. In such a case, device 10 might only need three leads, ground, power, and on/off. Device 10 however, also may be designed to be driven by an external signal generator (shown in FIG. 3) In such a case, controlling the motion of mirror element 16 may require additional pins and the substrate need not be a semiconductor.

In operation, an incident bundle of light rays 13 impinges the top face of device 10 where it reflects off of mirror element 16. Mirror element 16 is then made to twist or rotate about an axis defined by its supports such that it steers the reflected light through twice the angle of rotation of the mirror. Mirror element 16 will have associated with it a natural frequency of rotation, its "resonant frequency," at which it will rotate with a minimum driving force. By advantageously controlling the physical dimensions and the materials of mirror element 16, the resonant frequency of mirror element 16 may be tailored for particular applications. The resonant frequency of mirror element 16 is given by the expression:

$$f = \frac{1}{2\pi} \sqrt{\frac{\tau/I}{\theta}} \quad \text{or} \quad f = \frac{1}{2\pi} \sqrt{K/I}$$

where I is the moment of inertia of the mirror element $\tau$ is the peak vibrational torque reaction of the mirror at a peak amplitude, $\theta$. K is the spring constant, $\tau/\theta$, a measure of the rotational stiffness of the hinge elements 20 (shown in FIG. 2). The mechanical properties of simple geometries and most semiconductor materials are well known, and hence K and I can be determined for most situations.

A wide variety of systems may incorporate the electro-mechanical properties of mirror element 16. For instance, device 10 may repetitively steer a modulated laser beam onto a drum of a xerographic printer or universal product code ("UPC") scanner. In the first application, a laser beam scans onto a drum that attracts toner where the laser strikes it. The drum can then transfer the developed toner pattern onto plain paper to produce a printed image. In the latter application, a laser beam scans onto a product to be purchased by a consumer. The beam reflects off a series of spaced lines on the product and back to a photodiode detector. The scanner can then determine the identity of the product by the pattern of lines and the consumer may be accordingly charged. The laser beam must repetitively scan a volume of space so the product identity may be determined regardless of the orientation to the laser beam.

In other applications, a virtual display system may incorporate device 10. In such a system, a series of rows of display pixels from a spatial light modulator array are sequentially projected onto the resonant mirror while the mirror oscillates. A conventional deformable mirror device reflecting a white light source may form the series of rows. By advantageously timing the output of the deformable mirror device and the position of the resonating mirror, an entire full page display may result. The persistence of the viewer's eye will cause the viewer to perceive the series of adjacent lines as a full page display. Application for U.S. patent Ser. No. 808,827 "Virtual Display Device and Method of Use" to Nelson describes such a system. Finally, scanning either a spot, or an array of suitably modulated light pulses, can accomplish the exposure of a light sensitive media, such as photographic film, photoresist or any other photopolymer.

Figure 2:
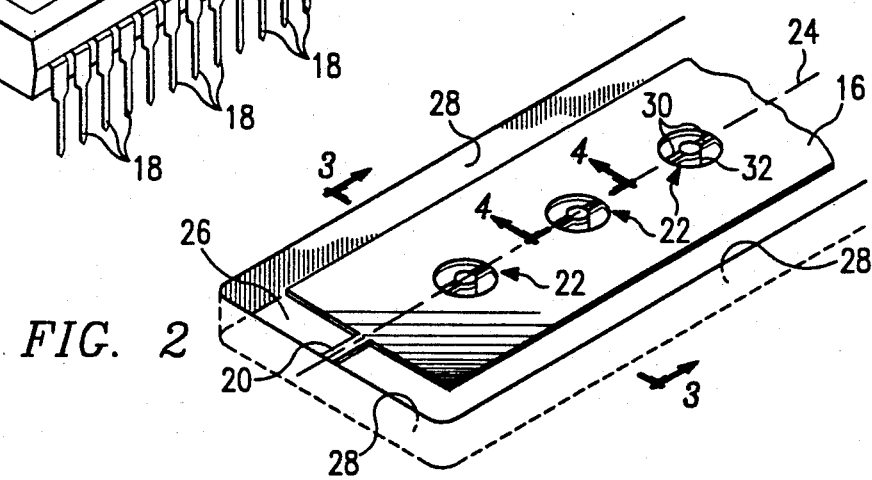
FIG. 2 illustrates the mirror element depicted in FIG. 1.

FIG. 2 depicts the left half of the mirror element 16 of FIG. 1. Although only the left portion of mirror element 16 is depicted, a symmetrical right portion is intended. A series of axially aligned posts support mirror element 16 along its length. Stability requires at least two supports. These may be either located at the end of mirror 16 as is hinge element 20 or may be displaced from an edge of mirror element 16 as are supporting members 22. All the supports align along line 24 forming the "axis of rotation." These intermediate supporting members 22 stiffen mirror element 16 in the long dimension without impeding the rotation of mirror element 16 about its axis of rotation. As a result, mirror element 16 is generally planar with the top of well 26 or to the underlying substrate. Each supporting member connects to the base of the well and insures the flatness of mirror element 16 during operation. Well 26 may, in fact, be etched from substrate 14 or may simply remain after fabrication of a layer or layers that form sidewalls 28. Sidewalls 28 are generally continuous around the perimeter of mirror element 16.

Without supporting member 22, mirror element 16 would sag into well 26 due to its relative great length and thin cross section. In operation, mirror element 16 would not rotate about its axis of rotation 24 when driven (as will be discussed below) but might simply sag downward further if it is fabricated without supporting member 22. Both results would interfere with the desired light steering capabilities of the device. Supporting member 22 itself comprises at least one hinge element 30 which connect mirror element 16 to a central post 32. In the preferred embodiment, supporting member 22 comprises two symmetrical hinge elements 30. These hinge members typically consist of the same material as hinge element 20 and mirror element 16, but of a different thickness.

Figure 3:
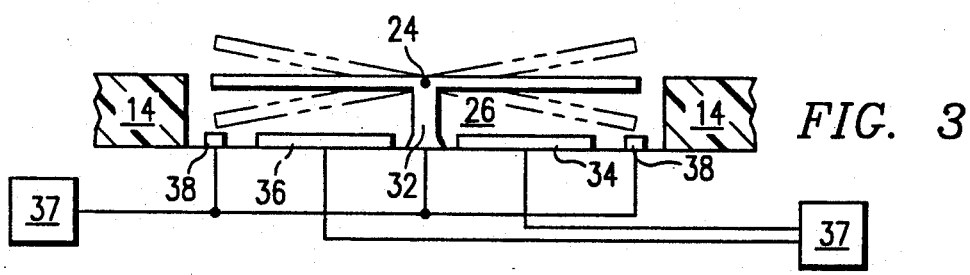
FIGS. 3 and 4 illustrate, in cross-sectional views, the mirror element depicted in FIG. 2 along lines 3—3 and 4—4 respectively.

FIG. 3 depicts mirror element 16 taken along line 3—3 of FIG. 2. A central post 32 in well 26 supports mirror element 16 along the axis of rotation 24. Device 10 also contains at least one electrode 34 displaced outwardly from the axis of rotation 24. A second complementary electrode 36 may be added to device 10 in a second position also displaced outwardly from the axis of rotation 24 and in a direction generally opposite from the direction of electrode 34. As depicted, electrodes 34 and 36 electrically connect to a signal generator 37. An additional voltage can be applied to the mirror element 16 by signal generator 39 to accomplish other control functions, such as bias and reset, because mirror element 16 and posts 32 are electrically isolated from electrodes 34 and 36. This is further disclosed in U.S. Pat. No. 5,061,049, issued Oct. 29, 1991. Signal generators 37 and 39 may be located within or without device 10.

Device 10 also might comprise one or two stops 38 displaced outwardly from electrodes 34 and 36 and held at the same electrical potential as mirror element 16. These stops, called landing electrodes, are positioned so mirror element 16 will strike them before striking the electrodes 34 and 36 or any other part of device 10. This prevents an electrical current from flowing between mirror element 16 and the electrodes 34 and 36, or any other part, which would fuse the two together or cause other damage. The electrodes and stops may be single sets of small pads, multiple sets of small pads or long strips running generally parallel to the axis of rotation.

Applying an alternating current between electrodes 34 and 36 can control the periodic rotation of mirror element 16 about its axis of rotation 24. The signals applied to electrodes 34 and 36, in the preferred embodiment, are 180° out of phase with each other and have a frequency equal to the resonant frequency of mirror element 16. Mirror element 16 is meanwhile held at an intermediate potential. Controlling the amplitude of the alternating waveform can regulate the amplitude of rotation.

In the above case, the mirror may be driven on, or off resonance, depending on the selection of driving voltage amplitude and frequency. In such a case, it deflects in an analog fashion about 50% of the maximum rotation angle. After that point, electrostatic attraction, which goes as the inverse square of the mirror 16 to electrode 34, 36 spacing, will overcome the linear restoring torque of hinges 30, and the mirror will land on landing electrode 38 at the full deflection angle. This is the digital mode of operation. The mirror 16 rotates through the maximum angle to precise resting point, or angle. Mirror inertia, I, and damping due to the gas present in the cavity 26 determine the rate of rotation. In one mode of operation, the mirror 16 will simply recoil from the landing electrode 38. In another mode, a specialized control pulse, called reset, may be utilized to precisely control the timing of the return rotation of the mirror.

Figure 4:
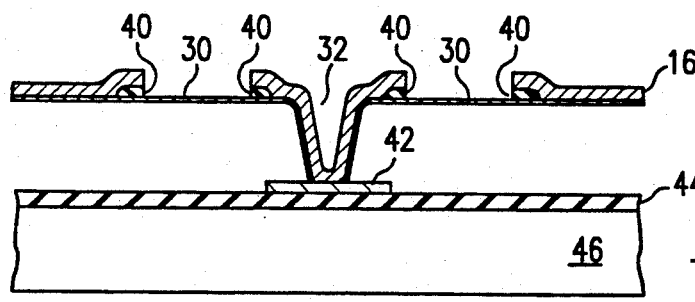

FIG. 4 depicts a cross-sectional view of mirror element 16 of FIG. 2 taken along line 4—4. Here, mirror element 16 connects to support post 32 by two thin hinge elements 30. Hinge elements 30 are partially covered by an oxide layer 40, a portion of which remains after manufacture as will be more fully described below. Central post 32 rests on electrically isolated pad 42 and layers 44 and 46. Substrate 46 may contain circuitry necessary to drive mirror element 16 about its axis of rotation as described above.

FIGS. 5a–5f illustrate, in cross-sectional view, sequential steps of the mirror element depicted in FIG. 4 during fabrication.

(a) Initially, substrate layer 46 is prepared using conventional photolithographic techniques. Substrate layer may contain, for instance, an internal oscillator for driving mirror element 16 (FIGS. 1–4) or other control circuitry.

A layer 44, possibly of silicon dioxide, insulates each support post pad 42 from the underlying substrate. Post pad 42 is approximately 3000 Angstroms thick and is fabricated from an alloy of aluminum, titanium, and silicon ("Ti:Si:Al"). After the Ti:Si:Al is sputter deposited onto silicon dioxide layer 44, it is patterned and plasma etched to define post pad 42, electrodes 34 and 36 and stops 38 (latter three shown in FIG. 3).

(b) A photoresist is then spun on and baked in, typically, three applications to a total thickness of approximately 4 microns to form spacer 48. Three applications of, typically positive, resist fill the thickness to prevent resist surface waves that can occur when spinning on a single, very thick layer. A bake of approximately 180° C. after each application of resist prevents the previous layers from dissolving in subsequent resist applications, to drive out excess solvent from the spacer and to avoid the formation of solvent bubbles under the hinge metal.

(c) Spacer 48 is etched to form a via that exposes each post pad 42.

(d) Approximately 800 Angstroms of Ti:Si:Al is applied to spacer 48 to form each part of each post and a thin hinge layer 50 from which the end hinges and central hinges are etched. The resistance to twist, or flexibility of the hinges may be controlled by controlling their length, width and thickness as well as by controlling their composition. Typically, each hinge is two microns wide. The support post hinges are ten microns long. Next, 1,500 Angstroms of silicon dioxide is deposited, patterned and etched to form hinge etch stops 52 over all future hinges.

(e) Approximately 3600 Angstroms of Ti:Si:Al is sputter deposited onto hinge layer 50 and hinge etch stops 52 to form mirror layer 54. The deposition of the metal of mirror layer 54 occurs under the same conditions as for the deposition of hinge layer 50 so that no stresses between the metal layers develop. Controlling the length, width, thickness and composition of each mirror controls the moment of inertia, I. Typically, each mirror element could be up to a centimeter wide and several centimeters in length. Finally, an etch stop layer 56 is deposited on top of mirror layer 54 for protection during subsequent fabrication steps.

Figure 5A:
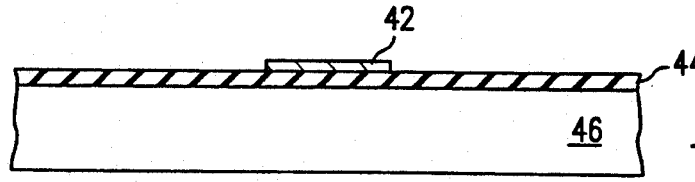
FIGS. 5a through 5f illustrate, in cross-sectional views, sequential steps of the mirror element depicted in FIG. 2 during fabrication.
Figure 5B:
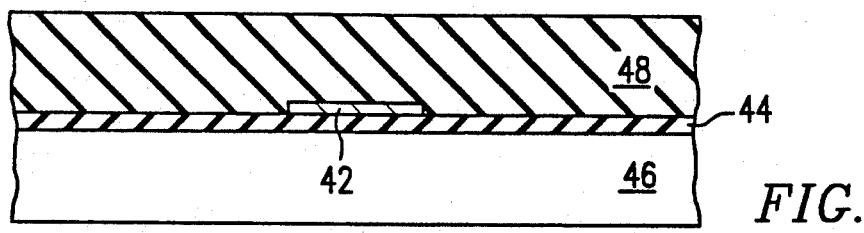
Figure 5C:
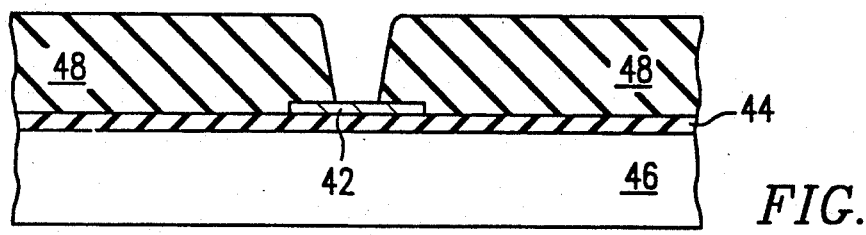
Figure 5D:
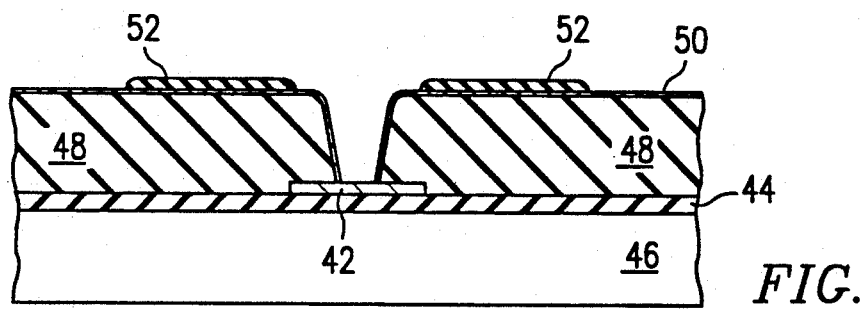
Figure 5E:
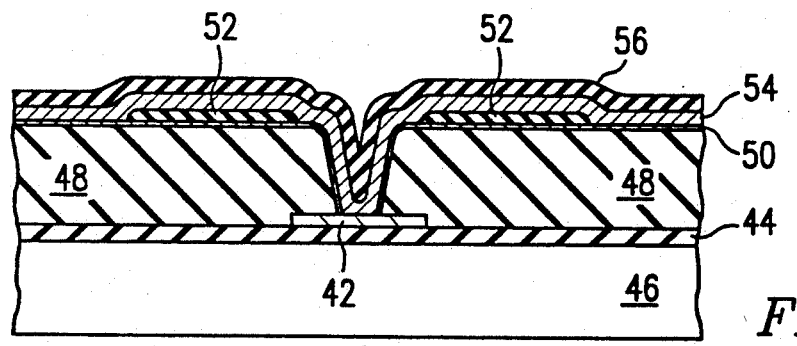
Figure 5F:
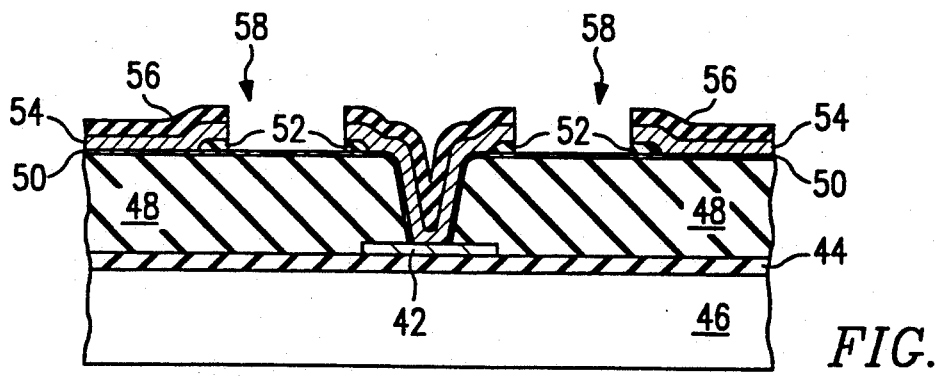

(f) A photoresist layer is applied to etch stop layer 56 and patterned to define mirror elements and plasma etch access holes 58 above hinge stops 52 (shown in FIG. 5e). The patterned photoresist layer may then be used as a mask for plasma etching the etch stop layer. Access holes 58 appear as a set "C's" facing one another when viewed from above. The plasma etch of the aluminum alloy may occur with a chlorine/boron trichloride/carbon trichloride etch gas mixture. After the remaining photoresist layer is removed, remaining etch stop layer 50 and the hinge etch stops 52 may be removed by an anisotropic etch.

Access holes 58 may be minimized by making them conform to the post and hinge dimensions, with a gap of only 1 or 2 microns separating the posts and hinges from mirror 16. This minimizes the optical effects of the post and hinge features on the mirror performance.

Spacer 48 is removed by, for instance, etching in oxygen with a few percent fluorine. The completed support post of the resonant mirror depicted in FIG. 4.

Optional end hinge 20 (depicted in FIG. 2) results from using the same steps as was the central post and hinge elements depicted in FIGS. 5a–5f. Each end hinge 20 integrates into the surrounding of non-rotating mirror metal. In some applications, it may be preferable to eliminate the surrounding structure, so that only the active mirror element protrudes above the substrate layer 46. Support posts could be provided at mirror extreme ends in that case.

A practical limitation of the embodiment described relates to the limiting spacer thickness and support post heights achievable using reasonable semiconductor processes. The size of the via formed in FIG. 5c relates by technical processes to the thickness of spacer layer 48. In general, the thicker the spacer layer the larger the subsequent via must be. The size of the via must be minimized, however, to minimize any optical aberrations in the resulting mirror element 16. This optical limitation, therefore, limits the thickness of spacer layer 48 and the maximum angle of rotation. Spacers of the prescribed 4 micron thickness will only permit small rotation angles for mirrors having any appreciable width. If a ±10 degree rotation angle is desired, the width of the mirror can only be a factor of 12 times the thickness of the spacer layer 48, or about 50 microns.

Figure 6:
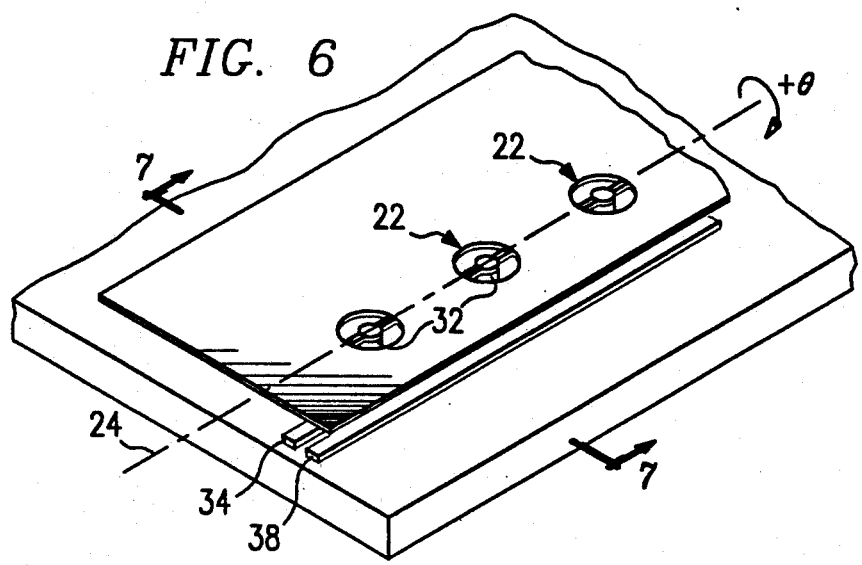
FIG. 6 depicts a second embodiment of the disclosed invention.
Figure 7:
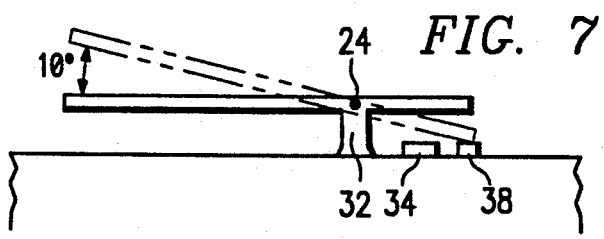
FIG. 7 illustrates, in cross-sectional view, the second embodiment of the disclosed invention depicted in FIG. 6 along line 7—7.

FIGS. 6 and 7 depict an asymmetric mirror structure that overcomes the limitation on rotation. It operates only in one direction, but provides for a relatively wide mirror and reasonable angles of operation within the above spacer constraints. The disadvantages are larger moment of inertia, I, and unidirectional operation.

Figure 8:
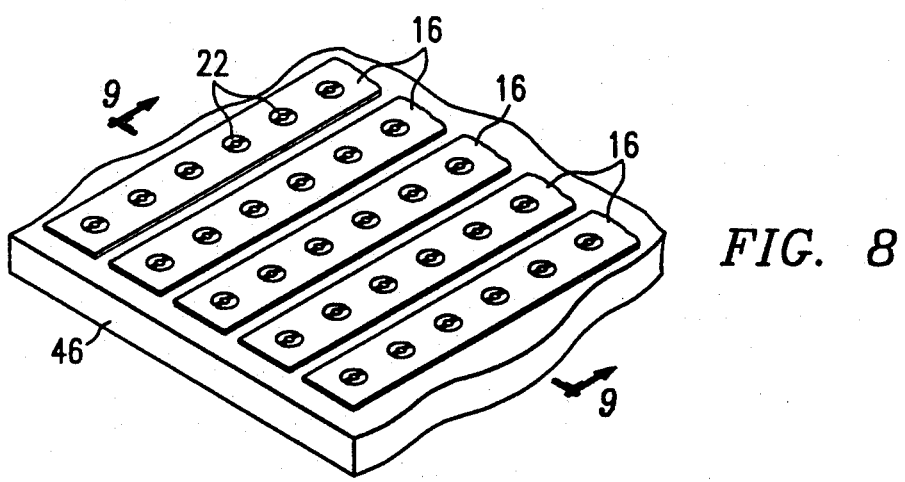
FIG. 8 depicts a third embodiment of the disclosed invention.
Figure 9:
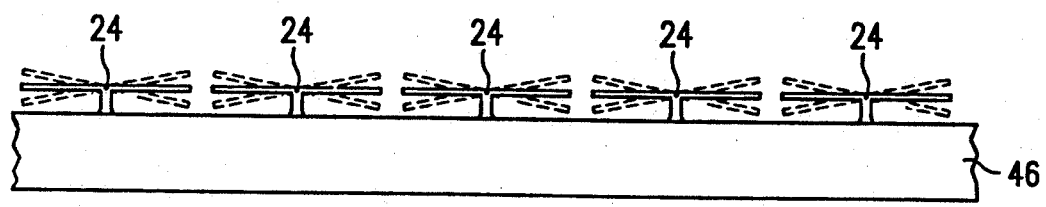
FIG. 9 illustrates, in cross-sectional view, the third embodiment of the disclosed invention depicted in FIG. 8 along line 9—9.

FIGS. 8 and 9 depict a practical way to achieve large area mirrors, that can operate through angles of 10 degrees or greater, and meet the manufacturing constraints of spacer layer 48 and support posts 32. In this approach, mirrors of large extent are segmented into a reticulated array of long slender elements 16. Each mirror element 16 is supported on a line of supporting elements 22 as shown in FIG. 3. Each mirror has the electrode 34 and stop 38 structure depicted in FIG. 3 necessary to address the mirror.

The optical effect of rotating the array of elements in synchronization about parallel axes 24 is equivalent to rotating a larger mirror through the same angle. An advantage of the reticulated mirror rotational scheme is that the extreme ends of the mirror array remain in approximately the same plane as the center elements. Unlike the conventional macroscopic galvanometer mirror, which introduces changes in the optical path length as a result of its rotation about an axis perpendicular to the optical path, the DMD mirror array accomplishes beam steering without changing the optical path length by more than a few microns. While galvanometers result in focus changes and other optical artifacts, the reticulated mirror method eliminates them. Fresnel lenses are constructed on the same principle.

As a result of the ability to individually tilt the long elements of the mirror array under precise electrical control, the array can be used to accomplish the same effect as a reflective Fresnel lens of a cylindrical type (e.g. having optical power along one axis only, and no optical power along the orthogonal axis). Signal generators 37 and 39 (shown in FIG. 3) may apply a prescribed series of voltage steps to the address electrodes of the parallel rows of mirrors corresponding to an equation describing the desired one dimensional optical surface. For instance, a plane mirror may be modeled by applying generally equivalent voltage levels to each electrode. Other optical surfaces may be modeled by tilting the mirrors a varying amount. This would provide an active, electronically programmable, reflective, cylindrical optical element, with minimum diffraction effects.

It is also possible under control of signal generators 37 and 39 to combine both the effect of the lens and the steering mirror. Light impinging on the surface could then be focused and redirected simultaneously. This is possible due to the very high response speed of the DMD monolithic semiconductor type mirror elements.

Figure 10:
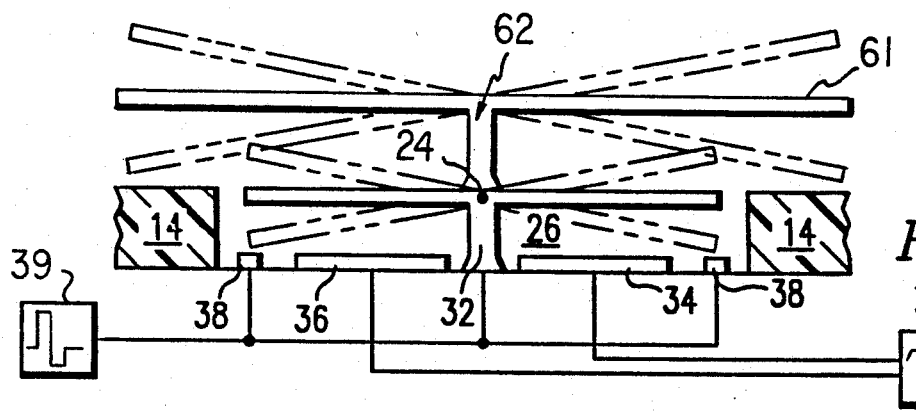
FIG. 10 shows an alternate embodiment of the present invention involving a layered structure with two active layers.

FIG. 10 shows an alternate embodiment of the present invention, where the steering mirror is mounted on a DMD-like structure. The mirror element is unchanged. It is still actuated by electrode 34 and 36 and lands on electrode 38. Along the axis of rotation 24 is a line of posts 62 which support another mirror 61. The post 62 is repeated along the length of the device's axis of rotation. Such a structure provides many benefits two of which are increase deflection angle, and removing the mirror from any effects of the actuating electronics. A similar structure is disclosed in U.S. Pat. No. 5,083,857, issued Jan. 28, 1992, "Multi-Level Deformable Mirror Device."

Figure 11:
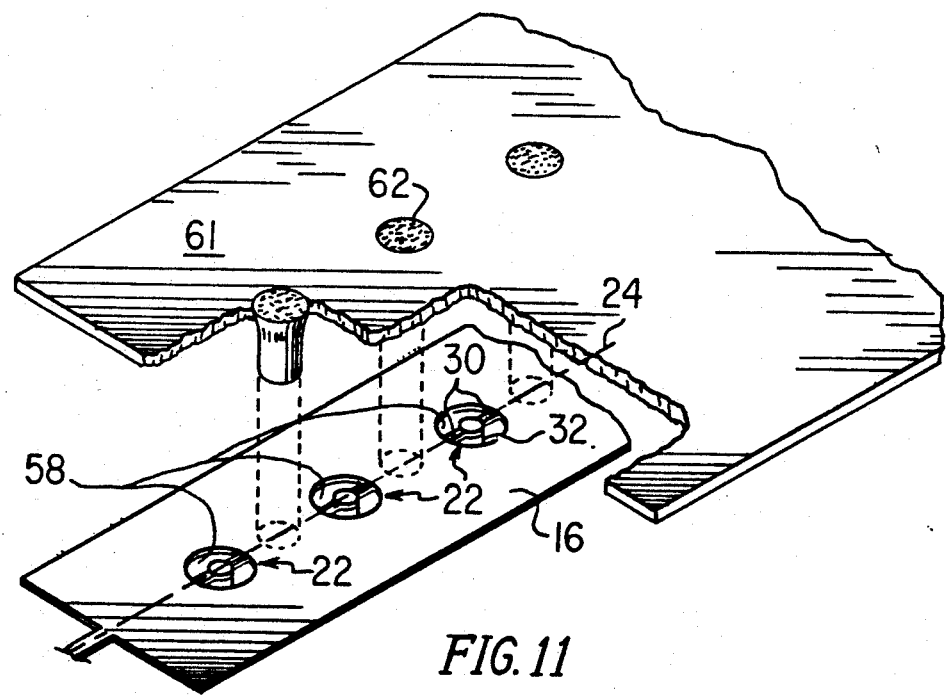
FIG. 11 shows a structure with two active layers in an exploded view.

FIG. 11 shows a view of the extended mirror 61 in relation to the mechanical support structure. Mirror element 16 supports post 62 which is repeated along the axis of rotation of the mirror element. As shown, these posts are spaced approximately equidistant between the access holes 58. Due to the size of the second mirror, more than one support post must be used. The posts support the mirror 61 which extends further than the original mirror 16. Another advantage of this embodiment lies in completely covering the actuated mirror 16 from the impinging light. Additionally, it offers a choice in the selection of materials. Mirror element 16 may consist of another material that is not reflective, if the designer so chooses.

FIG. 12a shows the original structure as depicted in FIG. 4, covered with another spacer 63. The original structure comprises the same part as before, hinges 30, posts 32, and mirror element 16. The original structure remains in its unetched state, such that the spacer underneath element 16 is intact except the vias cut for posts 32. Similar to the first process, vias 64 are etched into the second spacer 63, shown in FIG. 12b. The larger extent of the second mirror may require larger vias for more sturdy support posts. Additionally, the second spacer 63 may possess more depth than the first spacer layer 48, widening the gap between the two mirror structures.

FIG. 12c shows the metal filling the vias 64. This embodiment does not require hinges, so the support metal and the mirror metal could comprise the same layer of metal. The etching of access holes depends upon the size of the area array of these devices manufactured. If the array is smaller, and has less spacer material, the etch could get to the spacer by going under the mirror. A large area will probably require the use of access holes similar to the process previously discussed.

FIG. 12d shows the device after the etch. The etch may take longer, as there is more spacer to remove, the first layer 48 and the second layer 63, both from FIG. 12c. The resultant structure comprises a large mirror supported by a smaller mirror, wherein the smaller mirror interacts with the addressing circuitry, and the large mirror covers the smaller mirror from any light contact.

Thus, although there has been described to this point particular embodiments of a mirror for steering light, it is not intended that such specific references be considered as limitations upon the scope of this invention except in-so-far as set forth in the following claims.

What is claimed is:

1. A structure for steering light comprising:
   a. a substrate;
   b. at least one electrode proximate said substrate;
   c. a first element suspended substantially over said electrode, such that said element deflects towards said electrode along an axis when said electrode is addressed;
   d. at least two support posts on said first element positioned proximate to said axis of said first element; and
   e. a second element supported by said posts such that said second element deflects when said first element deflects, and wherein said second element has greater extent than said first element.

2. The structure of claim 1 wherein said first element further comprises a deformable mirror device.

3. The structure of claim 1 wherein said first element is further comprised of Ti:Si:Al.

4. The structure of claim 1 wherein said second element further comprises Ti:Si:Al.

5. A method of manufacturing a beam steering device comprising:
   a. preparing a substrate with addressing circuitry;
   b. spinning a first spacer over said addressing circuitry;
   c. etching said first spacer to form vias;
   d. forming posts by depositing a first metal layer over said first spacer such that said metal fills said vias;

e. patterning said first metal layer to form hinges;
f. depositing a second metal layer upon said first metal layer;
g. patterning said second metal layer to form deflection elements;
h. spinning a second spacer over said second metal layer;
i. cutting vias in said second spacer;
j. depositing a third metal layer to form posts in said vias and a mirror element with extents greater than said deflection elements; and
k. etching said first spacer to leave a deflection element that can deflect towards said addressing circuitry and a mirror supported by said deflection element with extends greater than said deflection element.

6. The method of claim 5 wherein said first and second spacers are photoresist.

7. The method of claim 5 wherein said first metal layer is Ti:Si:Al.

8. The method of claim 5 wherein said second metal layer is Ti:Si:Al.

9. The method of claim 5 wherein said third metal layer is Ti:Si:Al.

10. The method of claim 5 wherein said etching step further comprises a plasma etch.

* * * * *